F. H. WILCOX.
HORSE BLANKET.
APPLICATION FILED OCT. 26, 1916.
1,221,256.
Patented Apr. 3, 1917.
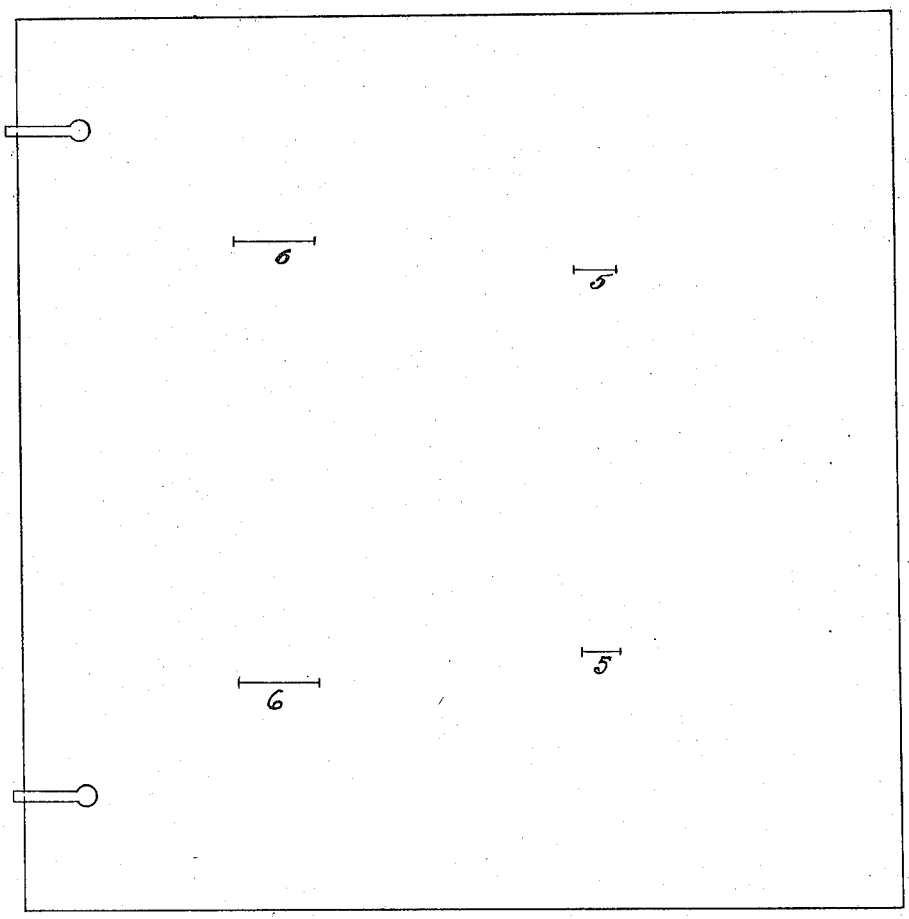
Inventor
Fredus H. Wilcox.

UNITED STATES PATENT OFFICE.

FREDUS H. WILCOX, OF NORTH BANGOR, NEW YORK.

HORSE-BLANKET.

1,221,256. Specification of Letters Patent. Patented Apr. 3, 1917.

Application filed October 26, 1916. Serial No. 127,853.

*To all whom it may concern:*

Be it known that I, FREDUS H. WILCOX, a citizen of the United States, residing at North Bangor, in the county of Franklin and State of New York, have invented new and useful Improvements in Horse-Blankets, of which the following is a specification.

This invention relates to an improved street horse blanket and has for its object preservation of the blanket from tears and at the same time better protection for the horse.

The drawing accompanying this specification shows a blanket distended and in plan view.

In this blanket there are shown slits for the passage of the ends of the thills. Two similar slits are provided, one on each side of the blanket to the rear of the first mentioned slits for the purpose of providing passages for the hold-back straps. The two slits 5 will normally be much smaller than the slits for the thills.

For a blanket about 7 feet long and about 7 feet wide a slit about 8 inches long, bound on the edges, is provided on each side about twenty-one inches from the middle to the side edge and also about twenty-one inches from the front edge through which the ends of the thills extend when the horse is hitched to a rig. This prevents the ends of the thills from punching holes through the blankets as they do in the blankets as now made. It greatly helps in holding the blanket in its proper place. Furthermore, it allows the blanket to fit much closer to the horse's shoulders and chest where it needs protection from drafts and cold more than anywhere else. With the blanket now in use, it is almost impossible to adequately protect a horse across the chest when hitched to a rig.

A slit is, also, provided on each side of the blanket about eighteen inches from the middle to the side edges and about twenty-seven inches back of the slit for the thill, through which the hold back straps may pass. This always holds the blanket in place and prevents its ever being blown off or worked off by the horse on to the ground, perhaps, under the horse's feet, as is frequently the case with the present street blanket. It, also, allows the blanket to fit closer to the body of the horse.

The blanket covers the thill tug and its bearer strap on each side and the rear portion of the blanket is tucked in between the shaft and the animal in such a position that the slit at the rear part of the blanket becomes useful to permit the hold-back straps to pass therethrough and thus assist in holding the blanket in position on the horse.

I claim:

An improved horse blanket provided with two slits near the front end for the passage of the ends of the thills and with two slits a little farther back through which the hold-back straps may pass.

FREDUS H. WILCOX.

Copies of this patent may be obtained for five cents each, by addressing the "Commissioner of Patents, Washington, D. C."